United States Patent [19]

Hruden

[11] Patent Number: 4,628,014
[45] Date of Patent: Dec. 9, 1986

[54] DEFERRED-ACTION BATTERY

[75] Inventor: Wayne R. Hruden, San Luis Obispo, Calif.

[73] Assignee: Ultimate Survivor of America Inc., San Luis Obispo, Calif.

[21] Appl. No.: 823,399

[22] Filed: Jan. 28, 1986

[51] Int. Cl.⁴ .......................................... H01M 6/30
[52] U.S. Cl. ................................ 429/113; 429/116; 429/117
[58] Field of Search ............... 429/116, 113, 110, 117, 429/114

[56] References Cited

U.S. PATENT DOCUMENTS

| Re. 15,846 | 5/1915 | French | 429/113 |
|---|---|---|---|
| 1,417,692 | 5/1922 | Rosen | 429/116 |
| 1,503,380 | 7/1924 | Rosen et al. | 429/117 |
| 1,518,301 | 12/1924 | Benner et al. | 429/116 |
| 2,832,814 | 4/1956 | Shannon | 429/116 |
| 2,852,592 | 9/1958 | Salauze | 429/116 |
| 2,918,517 | 12/1959 | Everett | 429/116 |
| 3,228,801 | 1/1966 | Snyder | 429/113 |
| 3,275,477 | 9/1966 | Schmid-Wildy | 429/113 |
| 3,376,166 | 4/1968 | Hruden | 429/116 |
| 3,394,033 | 7/1968 | Hickerson | 429/117 |
| 3,718,508 | 2/1973 | Levine | 429/114 |
| 4,031,296 | 6/1977 | Sarbacher et al. | 429/116 |

Primary Examiner—Anthony Skapars
Attorney, Agent, or Firm—Burns, Doane, Swecker & Mathis

[57] ABSTRACT

A deferred-action battery having a rotor in the form of a sealed annular chamber capable of holding an electrolytic solution and a stator capable of holding a carbon rod, cathode mix, separator, a bottom insulator and an anode, the top of the stator being complementary with the bottom of the rotor, such that the outer generally cylindrical surfaces of the stator and the rotor may be gripped by hand and twisted or rotated with respect to each other, rupturing the bottom of the rotor to activate the battery, is disclosed.

20 Claims, 8 Drawing Figures

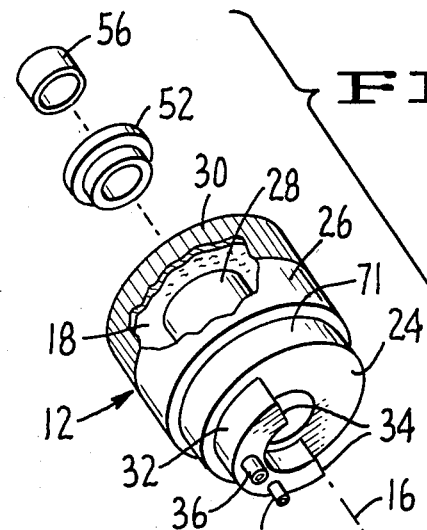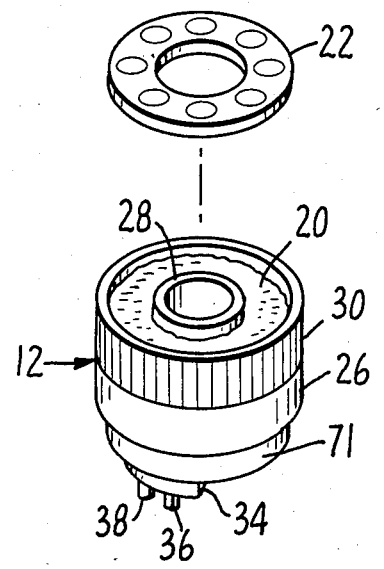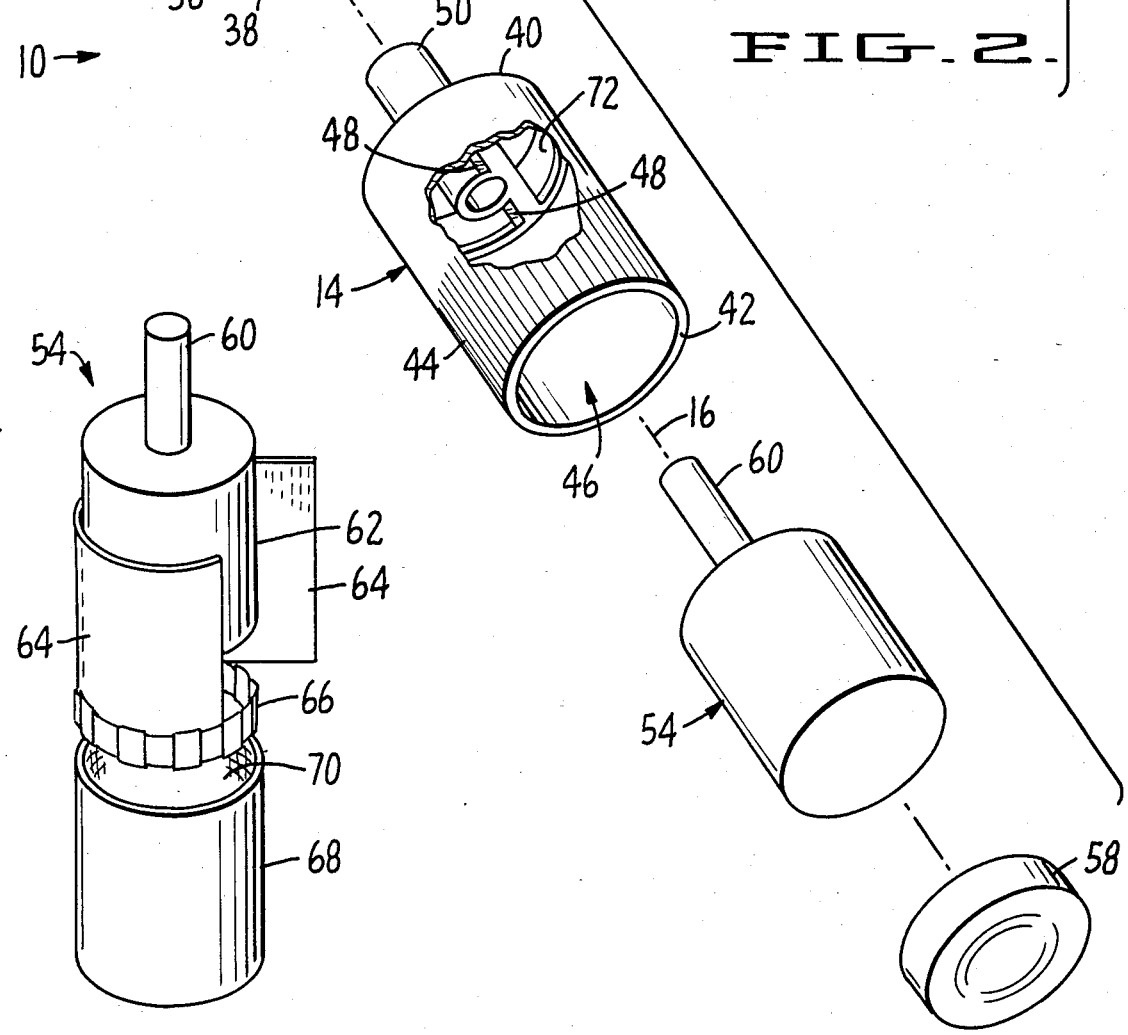

DEFERRED-ACTION BATTERY

BACKGROUND OF THE INVENTION

1. Field of the Invention

The invention relates to batteries. It refers more specifically to improved battery structure that permits the battery to be stored indefinitely and thereafter activated by grasping the outside of the battery and rotating one component with respect to another to activate the battery.

2. Prior Art

Over the past several years the production and consumption of primary batteries has grown at a phenomenal rate. It is estimated that in the United States alone, over twenty billion dry-cell batteries (such as Leclanché cells, like zinc-carbon and zinc chloride, and Alkaline cells, like manganese, mercury, silver, etc.) were manufactured in 1985, with more than half of them dying on the shelf without ever being used. The environmental impact of the above-mentioned realities is at one time both startling and profound. As a consequence of this astronomical number of electrical cells being wasted while in storage, vast quantities of valuable material resources are instantly being transmuted into unnecessary land pollution. In addition to the conservational and environmental concerns, a frightening ramification of this battery disposal is toxic mercury contamination resulting in the very substantial injection of this poison into our fragile ecosystem. Compounding these problems is the intolerable waste of the immense electrical energy necessary for making batteries that are never utilized because of premature demise. It would therefore be highly desirable to have a deferred-action battery that did not require mercury, that would have indefinite shelf life and that could be activated only when ready to use.

In U.S. Pat. No. 2,832,814 issued Apr. 29, 1958 to Shannon, there is a disclosed a stem that extends from the battery under a protective cap and that allows the user to break a frangible weakened portion of the electrolyte reservoir to activate the battery.

In U.S. Pat. No. 3,228,801 issued Jan. 11, 1966 to Snyder, there is disclosed a deferred-action battery in which an impervious barrier is located between the electrolyte paste and the zinc can. To activate the battery, the impervious barrier is drawn out of the battery thereby permitting contact of the previously separated elements.

In another type of deferred-action battery, a liquid electrolyte is stored within the zinc cup, and the remaining elements of the battery are plunged into the liquid electrolyte to activate the battery. This type of structure is shown in U.S. Pat. Re. No. 15,846, issued May 27, 1924 to French and in U.S. Pat. No. 1,518,301 issued Dec. 9, 1924 to Benner et al.

In the patent to French, the cartridge is provided with external threads that engage internal threads located at the open upper end of the zinc can. The user twists the cartridge relative to the zinc can, and the threads cause the cartridge to be screwed into the can. As the cartridge advances into the can, it strikes and breaks a wax seal that confines the liquid electrolyte, permitting the latter to contact the cartridge, thereby activating the battery.

This activation structure suffers from two major drawbacks. First, the wax seal may be broken accidentally; and second, the length of the battery after activation is shorter than its length before activation. As will be seen below, the structure of the present invention overcomes both of these disadvantages.

Probably the most widely used structure for activating a deferred-action battery is the frangible member. Frangible members have been employed in U.S. Pat. No. 1,417,692 issued May 30, 1922 to Rosen; U.S. Pat. No. 1,503,380 issued July 29, 1924 to Rosen et al.; U.S. Pat. No. 2,852,592 issued Sept. 16, 1958 to Salauze; U.S. Pat. No. 3,376,166 issued Apr. 2, 1968 to Hruden; and U.S Pat. No. 4,031,296 issued June 21, 1977 to Sarbarcher et al.

One problem common to batteries employing a frangible member is that the member is susceptible to being broken through inadvertence, as when the battery is accidentally dropped. A frangible member is by its very nature more readily broken than the remaining structure. In some designs the frangible member is also susceptible to damage at temperature extremes. As will be seen below, the battery of the present invention overcomes these problems of earlier designs.

In the earlier mentioned U.S. Pat. No. 3,376,166, the inventor of the instant application discloses a deferred-action dry cell battery structure wherein when it is desired to activate the dry cell and start the shelf life thereof, a safety cap is removed therefrom and the cathode cap is pressed down to move a carbon rod and rod sleeve down, thus rupturing a membrane triggering a chain of events to activate the battery.

U.S. Pat. No. 3,718,508 issued Feb. 27, 1973 to Levine, discloses an automatically-activated delay-action battery containing an electrolyte sealed in an ampoule which is also axially movable but completely within an outer casing. This battery is used in an artillery projectile wherein firing of the projectile causes a set-back force which slides a sleeve contained within the battery axially, i.e. linearly and not rotatably, to activate the battery. The components of the battery are all internal to a shell and cannot be manipulated by hand.

It would be highly desirable to have a deferred-action battery the outside dimensions of which are the same before and after activation, that could be activated by manual rotation of outside portions of the battery with respect to each other, that did not require extraordinary force or circumstances such as the shock forces created by being shot from an artillery piece, that did not require a safety cap, and that could not be accidentally activated by ordinary handling mishaps such as dropping the battery.

Finally, my commonly assigned U.S. patent application Ser. No. 601,865, filed Apr. 19, 1985, the disclosure of which is incorporated herein by reference, discloses a battery which is activated by rotation and which utilizes misaligned openings, gaskets and the like at the critical interface of the active components. The instant invention is an improvement to that invention wherein the activating component, such as an electrolytic solution, may be easily injected into a chamber which becomes integrally sealed, the chamber itself to be ruptured upon activation and therefore providing superb isolation of the activating solution.

SUMMARY OF THE INVENTION

The purpose of the instant invention is to provide a battery structure that permits the battery to be stored indefinitely and thereafter to be activated by manual manipulation of the outsides of the battery while maintaining the outside dimensions of the battery before and after activation. To accomplish this purpose the instant invention provides a deferred-action battery having a rotor means to contain an electrolytic solution and a stator means to contain a carbon rod, cathode mix, separator, a bottom insulator and an anode, the means being rotatably mounted with respect to each other, the bottom of the rotor means interfacing and being complementary with the top of the stator means, wherein the means are capable of being grasped externally by hand and rotated with respect to each other, such rotation rupturing the bottom of the rotor means to allow communication of the solution and the mix to activate the battery.

Specifically, a first aspect of the instant invention provides a deferred-action battery comprising:

a rotor means having a longitudinal axis therethrough, said rotor means including a first chamber capable of holding an electrolytic solution, said first chamber having at least one off-axis portion thereof that protrudes axially away from the remainder of said first chamber; and a stator means rotatably mounted about said axis, said stator means having a second chamber which is capable of holding a carbon rod, cathode mix, separator, a bottom insulator and an anode, said stator means axially adjacent to said rotor means, said rotor means and said stator means being rotatable with respect to each other, said axis portion axially extending into said second chamber, said stator means including rupturing means extending radially from said axis and rotatable to contact said off-axis portion of said first chamber, said rupturing means capable of destroying the integrity of said off-axis portion upon rotation of said rotor means with respect to said stator means to allow communication between said first and second chambers and activation of the battery.

Another aspect of the instant invention provides a deferred-action battery comprising:

a rotor means to contain an electrolytic solution, said rotor means having a longitudinal axis, said rotor means having a sealed annular chamber capable of holding an electrolytic solution, the chamber concentrically disposed about said axis, said chamber having a top, bottom and generally cylindrical outer wall, said outer wall capable of being gripped by hand; and a stator means to contain a carbon rod, cathode mix, separator, a bottom insulator and an anode, said stator means being generally axially adjacent and rotatably mounted with respect to said rotor means about said axis, said stator means having a chamber capable of holding a carbon rod, cathode mix, separator, a bottom insulator and an anode, the chamber having a top, bottom and generally cylindrical outer wall which is capable of being gripped by hand, the top of said chamber complementary to the bottom of said rotor means, said outer wall of said rotor means and said outer wall of said stator means capable of being gripped by hand simultaneously in order to rotate the rotor means with respect to the stator means, rupturing the bottom of said rotor means to allow communication between said chambers to activate the battery.

Yet another aspect of the instant invention provides a deferred-action battery comprising:

a rotor means to contain electrolytic solution, said rotor means comprising a generally annular chamber having a top, bottom and an outer cylindrical wall which is capable of being gripped by hand, said bottom including first and second openings; and a stator means to contain a carbon rod, cathode mix, separator, a bottom insulator and an anode, said stator means being adjacent and rotatably mounted with respect to said rotor means and having a chamber having a top, bottom and an outer cylindrical wall which is capable of being gripped by hand, said top wall including third and fourth openings and outwardly projecting first and second plug members which are complementary to said first and second openings in said rotor means, respectively, and which are in sealing engagement with said first and second openings, said outer wall of said rotor means and said outer wall of said stator means capable of being gripped by hand simultaneously in order to rotate said rotor means with respect to said stator means to disengage said plug members, further rotation of said means capable of aligning said first opening with said third opening and said second opening with said fourth opening to allow communication between said chambers to activate the battery.

DESCRIPTION OF THE DRAWING

FIG. 1 is an exploded perspective view of the preferred embodiment of the instant invention.

FIG. 2 is a partially exploded perspective view of the rotor means of the preferred embodiment wherein the cap has been removed to illustrate the interior or chamber of the rotor means.

FIG. 3 is an exploded perspective view of the electrode assembly which is inserted into the stator means as seen in FIG. 1.

DESCRIPTION OF THE PREFERRED EMBODIMENTS

Figure 4:
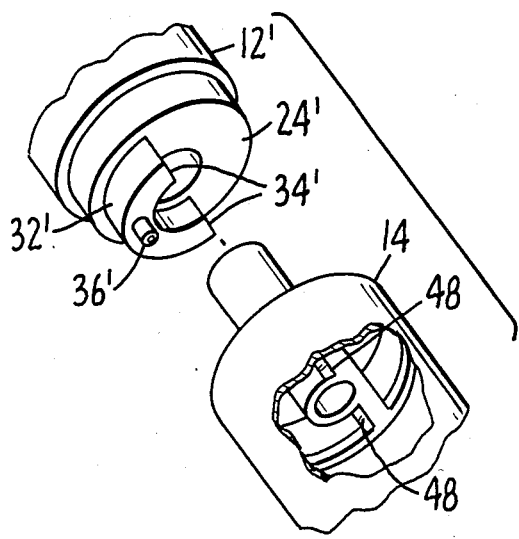
FIG. 4 is an exploded partial perspective view in an alternate embodiment of the instant invention.

With continued reference to the drawing, FIG. 1 is an exploded perspective view of the preferred embodiment of a deferred-action battery, shown generally at 10, of the instant invention. It can be seen that FIGS. 1-3 relate to this embodiment.

Throughout the description, the invention will be referred to as a battery, in accordance with popular usage, rather than a cell, which may be more accurate in the narrow-technical sense. It is understood that the invention relates to a deferred-action battery of wet cell construction wherein the electrolyte or electrolytic solution is carried in a chamber which is a part of the battery construction. Activation is achieved simply by manipulating the battery and allowing gravity to force the electrolytic solution to flow from the chamber into an anode-cathode chamber.

In all of the embodiments disclosed, a structure appropriate to a size D battery is shown, but it can be readily appreciated that by altering the dimensions of the parts, the invention may be adapted to batteries of other sizes and geometries.

Although the chemistry of the battery is not the subject of the present invention, it should be mentioned that the embodiments shown are intended for use in a Leclanché cell, and for that reason when mention is made below of a zinc can or a carbon rod, it will be understood that these materials are used by way of example only and are not intended to limit the field of use of the battery structure disclosed. The present invention is related to the structure of the inert portions of the battery which together provide a mechanical expression of the activation concept. In the present invention, so long as the structural parts are inert to the chemicals used, any of a wide variety of materials may be employed. In the best mode presently known of practicing the invention, and by way of example, the parts are molded of a plastic material known as polypropylene because of its adaptability to injection molding and its other excellent mechanical properties. Other suitable materials known to one skilled in the art are also within the scope of the invention.

As seen in the exploded perspective view of FIG. 1, the battery 10 structure, in the preferred embodiment, includes rotor means 12 and stator means 14. Rotor means 12 has a longitudinal axis 16 therethrough and stator means 14 is rotatably mounted about the axis 16. Rotor means 12 includes a first chamber 18. First chamber 18 is a sealed annular chamber which is capable of holding an electrolytic solution 20 as seen in FIG. 2 where the top 22 of the rotor means 12 has been removed for purposes of illustration. The rotor means 12 may, in fact, be made in two parts, the first part including the bottom 24, a generally cylindrical outer wall 26 and an inner cylindrical wall 28. The second part of the rotor means 12 is the top 22 which is sealed to the inner wall 28 and the outer cylindrical wall 26 such as by ultrasonic welding to form the sealed annular chamber.

The outer cylindrical wall 26 of the rotor means 12 is capable of being gripped by hand at surface 30 which is shown to be grooved or roughened for the purpose of gasping between one's fingers.

The bottom 24 of rotor means 12 is provided with an off-axis portion 32 that protrudes axially away from the remainder of the chamber 18. It is within the scope of the invention to provide more than one such off-axis portion as will be discussed with respect to the embodiment of FIG. 6. The off-axis portion 32 is shown to be provided with two faces 34 which will interface with portions of the stator means 14 as will be discussed later. Off-axis portion 32 includes port means 36 which is preferably an axially extending nozzle or equivalent which allows access to chamber 18. Off-axis portion 32 also includes vent means 38 which is also preferably an axially extending nozzle. It can be seen in this embodiment that the sealed first or annular chamber 18 may be filled through port means 36 with an electrolytic solution and that vent means 38 will allow for the exit of gas that may be displaced as the chamber is filled through the port means. Both the port means 36 and the vent means 38 may thereafter be sealed such as by ultrasonic welding or by application of a small amount of permanent sealing material such as a silicone adhesive or polypropylene applied with a hot glue gun. It is understood this seal is not at a rupture point between the rotor means and the stator means, but rather causes the chamber 18 to become integrally sealed.

Stator means 14 is capable of holding a cathode mix. The stator means 14 is generally axially adjacent and rotatably mounted with respect to the rotor means 12 about the longitudinal axis 16. Stator means 14 contains a second chamber, hereinafter also referred to simply as a "chamber 46", having a generally cylindrical outer wall 44 which is capable of being gripped by hand. The outer wall 44 is also shown to be grooved or roughened on the surface thereof. The top 40 of the chamber shown generally at 46 is complementary to the bottom 24 of the rotor means. Specifically, by the term complementary it is understood that off-axis portion 32 of the rotor means 12 extends within the confines of the chamber of the stator means 14 and that the stator means 14 includes a rupturing means 48 which extends radially from the axis 16 and is rotatable to contact the off-axis portion 32 of the first or annular chamber 20. Specifically, the rupturing means 48 comprises an edge portion shown to be a knife edge or the like which when assembled will abut the faces 34 of the off-axis portion 32. It is understood that other designs for the rupturing means such as a blunt but thin edge, a curved sharp edge, a pointed or spear-like projection, etc., that are capable of rupturing the faces 34 of the portions of the rotor means 12 as will occur to one skilled in the art are within the scope of the invention. Thus, it can be seen that when the outer wall 30 of the rotor means 12 and the outer wall 44 of the stator means 14 are gripped by hand simultaneously and are rotated with respect to each other the chamber 18 of the rotor means 12 will be ruptured to allow communication between the chambers to activate the battery. Specifically, the knife edge of the rupturing means 48 will sever the faces 34 of the off-axis portion 32 allowing the electrolytic solution contained within the chamber 18 to flow into the chamber 46 containing the cathode mix.

The top 40 of the stator means 14 also includes an upstanding collar 50 which is slidably and rotatably fitted within the annular opening in the chamber 18 of the rotor means 12 and which is secured by a retaining washer 52.

FIG. 1 also illustrates the electrode assembly shown generally at 54 as well as electrically conductive top terminal 56 and bottom terminal 58. Electrode assembly 54 includes a carbon rod 60, a cathode mix or cathodic mix bobbin 62, liner paper 64, bottom insulator 66 and zinc can 68 (the anode) which contains an interface material 70, all as is well known in the battery art. It is understood that the liner paper 64 and interface material 70 define a separator. The electrode assembly 54 is inserted into the chamber 46, the carbon rod 60 extending through the collar 50 and the retaining washer 52 to be electrically and mechanically connected to top terminal 56 which will fit generally flush with the top of the battery. Zinc can (anode) 68 is electrically and mechanically connected to bottom terminal 58 which upon assembly fits flush within the bottom 42 of stator means 14. With reference to FIG. 2 it can be seen that the slightly inset and smooth surface 71 of the rotor means 12 will fit within the top of the stator means 14 and will rotatably slide with the smooth inner surface portion 72 as seen in FIG. 1. It thus can be seen that the chamber 46 is capable of holding the carbon rod 60, cathode mix (cathode mix bottom 62), separator (liner paper 64 and the interface material 70), bottom insulator 66 and an anode (zinc can 68).

FIG. 4 illustrates an alternate embodiment substantially identical to the embodiment of FIGS. 1-3 wherein the rotor means 12' is provided with an annular chamber having a bottom 24' and an off-axis portion 32' and a port means 36'. The off-axis portion 32' is also provided with faces 34'. In this embodiment all components are identical to that illustrated and described with respect to FIG. 1 with the exception that the vent means of FIG. 1 is not utilized. In this embodiment the filling and venting of chamber of the rotor means 12' is completely accomplished through the nozzle 36'.

An identical stator means 14 may be utilized in this embodiment. Specifically, a stator means 14 having rupturing means 48 which will interface with the surfaces 34' of the rotor means 12' is utilized.

Figure 5:
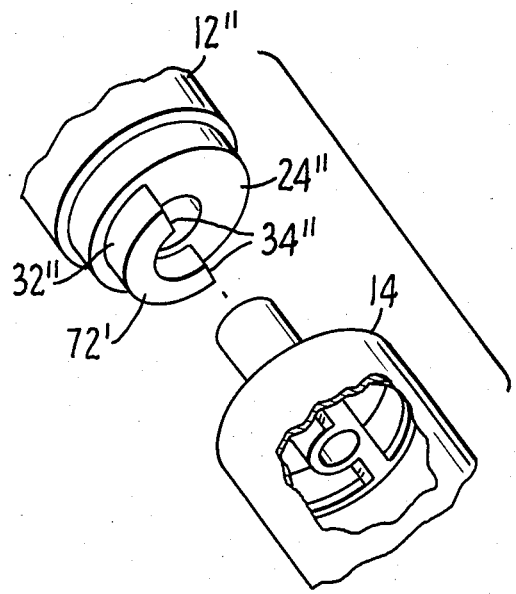
FIG. 5 is an exploded partial perspective view of yet another embodiment of the instant invention.

FIG. 5 is a partial perspective view similar to FIG. 4 of yet another embodiment wherein the rotor means 12" comprises a chamber having a bottom surface 24" having an off-axis portion 32" and having faces 34". In this embodiment the off-axis portion 32" has no port or vent means. In this embodiment the annular chamber 18 of the rotor means 12" is filled as suggested by FIG. 2 wherein the chamber 18 is filled with electrolytic solution before the top 22 as seen in FIG. 2 is sealed with respect to the remainder of the annular chamber. In the embodiment of FIG. 5 the stator means 14 is again identical to that illustrated in FIGS. 1 and 4.

Figure 6:
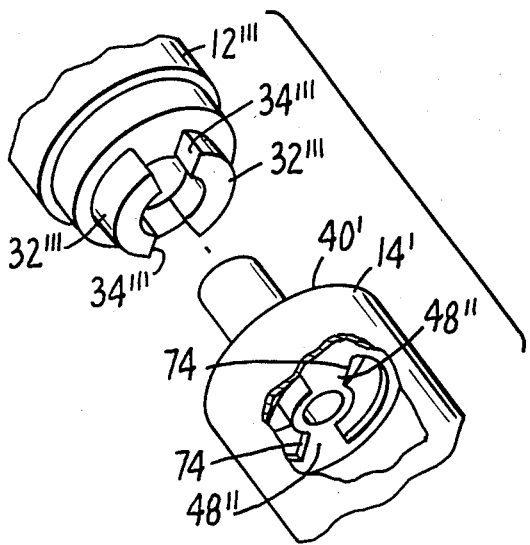
FIG. 6 is an exploded partial perspective view of still another embodiment of the instant invention.

FIG. 6 illustrates yet another embodiment of the instant invention wherein the rotor means 12''' is provided with more than one off-axis portion 32'''. In this embodiment the annular chamber of the rotor means 12''' is again filled as suggested by FIG. 2 and as discussed with respect to the embodiment illustrated in FIG. 5. Specifically, the rotor means 12''' is filled with the top 22 removed, the top subsequently being sealed with respect to the remainder of the annular chamber of the rotor means 12'''. However, in this embodiment the stator means 14' is provided with a slightly modified top 40' which includes an alternate embodiment of a rupturing means 48". In this embodiment the rupturing means 48" is a generally butterfly-shaped plate arrangement having knife edges 74 disposed on the opposite edges thereof to interface with the faces 34''' of the rotor means 12'''.

Figure 7:
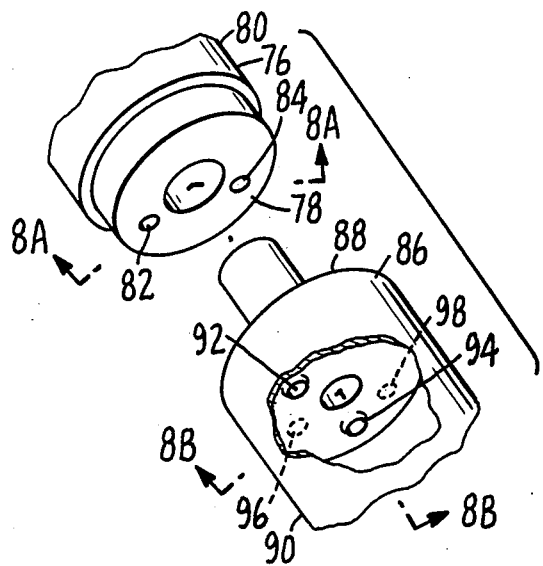
FIG. 7 is an exploded partial view of still yet another embodiment of the instant invention.
Figure 8:
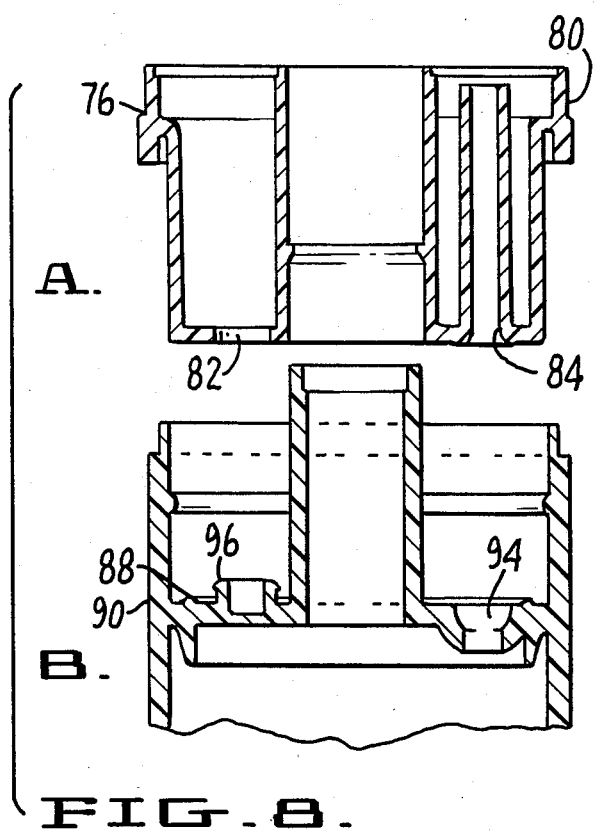
FIG. 8 is a partial cross-sectional view taken along section lines A—A and B—B in FIG. 7.

FIGS. 7 and 8 illustrate another embodiment of the instant invention wherein the rotor means 76 to contain electrolytic solution comprises a generally annular chamber having a bottom 78 and an outer cylindrical wall 80 which is capable of being gripped, as in the other embodiments, by hand, the bottom including a first opening 82 and a second opening 84. First opening 82 is the drain opening for the rotor means chamber and second opening 84 is a vent tube which will expedite drainage of the chamber. The stator means 86 to contain a cathode mix is again adjacent and rotatably mounted with respect to the rotor means and has a chamber having a top 88 and an outer cylindrical wall 90 which is capable of being gripped by hand. The top wall 88 includes a third opening 92 and a fourth opening 94 and outwardly projecting first plug member 96 complementary to the first opening 82 and a second plug member 98 (only shown in phantom in FIG. 7) complementary to second opening 84. First plug member 96 is in sealing engagement when assembled with the first opening 82. Second plug member 98 is in sealing engagement with second opening 84. It can be seen that manual gripping of the outer wall of the rotor means and of the outer wall of the stator means simultaneously to rotate the rotor means with respect to the stator means will disengage the first plug member 96 and the second plug member 98 rupturing the chamber of the rotor means 76, further rotation of said means with respect to each other capable of aligning the first opening 82 with the third opening 92 and the second opening 84 with the fourth opening 94 to allow communication between the chambers to activate the battery. It can be seen that the annular chamber of the rotor means 76 may be easily filled through the first opening 82 during assembly.

The foregoing detailed description is illustrative of several embodiments of the invention, and it is to be understood that additional embodiments thereof will be obvious to those skilled in the art. The embodiments described herein together with those additional embodiments are considered to be within the scope of the invention as described in the claims appended hereto.

What is claimed is:

1. A deferred-action battery comprising:
   a rotor means having a longitudinal axis therethrough, said rotor means including a first chamber capable of holding an electrolytic solution, said first chamber having at least one off-axis portion thereof that protrudes axially away from the remainder of said first chamber; and
   a stator means rotatably mounted about said axis, said stator means having a second chamber which is capable of holding a carbon rod, cathode mix, separator, a bottom insulator and an anode, said stator means axially adjacent to said rotor means, said rotor means and said stator means being rotatable with respect to each other, said axis portion axially extending into said second chamber, said stator means including rupturing means extending radially from said axis and rotatable to contact said off-axis portion of said first chamber, said rupturing means capable of destroying the integrity of said off-axis portion upon rotation of said rotor means with respect to said stator means to allow communication between said first and second chambers and activation of the battery.

2. A battery as in claim 1 wherein said off-axis portion includes port means to fill said first chamber with electrolyte solution, said port means capable of being subsequently sealed.

3. A battery as in claim 2 wherein said off-axis portion also includes vent means to allow for the exit of gas that may be displaced as said first chamber is filled through said port means, said vent means capable of being subsequently sealed.

4. A battery as in claim 2 wherein said port means is an axially extending nozzle.

5. A battery as in claim 3 wherein said port means and said vent means are axially extending nozzles.

6. A battery as in claim 1 wherein said rupturing means includes a knife edge which is capable of penetrating said off-axis portion upon rotation of said rotor means with respect to said stator means.

7. A battery as in claim 1 wherein said first chamber includes a plurality of off-axis portions.

8. A battery as in claim 1 wherein said first chamber includes a separate top portion that is generally perpendicular to said axis, said top portion capable of being sealed to said first chamber to enclose said chamber after filling said chamber with electrolytic solution.

9. A battery as in claim 7 wherein said first chamber includes a separate top portion that is generally perpendicular to said axis, said top portion capable of being sealed to said first chamber to enclose said chamber after filling said chamber with electrolytic solution.

10. A deferred-action battery comprising:
    a rotor means to contain an electrolytic solution, said rotor means having a longitudinal axis, said rotor means having a sealed annular chamber capable of holding an electrolytic solution, the chamber concentrically disposed about said axis, said chamber having a top, bottom and generally cylindrical outer wall, said outer wall capable of being gripped by hand; and a stator means to contain a carbon rod, cathode mix, separator, a bottom insulator and an anode, said stator means being generally axially adjacent and rotatably mounted with respect to said rotor means about said axis, said stator means having a chamber capable of holding a carbon rod, cathode mix, separator, a bottom insulator and an anode, the chamber having a top, bottom and generally cylindrical outer wall which is capable of being gripped by hand, the top of said chamber complementary to the bottom of said rotor means, said outer wall of said rotor means and said outer wall of said stator means capable of being gripped by hand simultaneously in order to rotate the rotor means with respect to said stator means rupturing the bottom of said rotor means to allow communication between said chambers to activate the battery.

11. A battery as in claim 10 wherein the top of said stator means includes a knife edge which is capable of penetrating the bottom of said rotor means.

12. A battery as in claim 10 wherein the top of said rotor means is separable to allow for filling said annular chamber.

13. A battery as in claim 10 wherein said rotor means comprises a sealed annular chamber.

14. A battery as in claim 10 wherein the bottom of said annular chamber includes port means to fill said chamber.

15. A battery as in claim 13 wherein the bottom of said annular chamber includes port means to fill said chamber.

16. A battery as in claim 14 wherein the bottom of said annular chamber also includes a vent means to allow for the exit of gas that may be displaced as said annular chamber is filled.

17. A battery as in claim 10 wherein the top of said rotor means comprises the top of the battery and the bottom of said stator means comprises the bottom of the battery.

18. A battery as in claim 17 wherein the top of said stator means includes an upstanding tube which is concentrically located within the annular space of said rotor means, said rotor means rotating about said tube.

19. A deferred-action battery comprising:

a rotor means to contain electrolytic solution, said rotor means comprising a generally annular chamber having a top, bottom and an outer cylindrical wall which is capable of being gripped by hand, said bottom including first and second openings; and a stator means to contain a carbon rod, cathode mix, separator, a bottom insulator and an anode, said stator means being adjacent and rotatably mounted with respect to said rotor means and having a chamber having a top, bottom and an outer cylindrical wall which is capable of being gripped by hand, said top wall including third and fourth openings and outwardly projecting first and second plug members which are complementary to said first and second openings in said rotor means, respectively, and which are in sealing engagement with said first and second openings, said outer wall of said rotor means and said outer wall of said stator means capable of being gripped by hand simultaneously in order to rotate said rotor means with respect to said stator means to disengage said plug members, further rotation of said means capable of aligning said first opening with said third opening and said second opening with said fourth opening to allow communication between said chambers to activate the battery.

20. A battery as in claim 19 wherein the top of said stator means includes an upstanding tube which is concentrically located within the annular space of said rotor means, said rotor means rotatable about said tube.

* * * * *